United States Patent [19]
Lithen

[11] 3,752,317
[45] Aug. 14, 1973

[54] OIL RECOVERY VESSEL
[75] Inventor: Eric E. Lithen, Garden City, N.Y.
[73] Assignee: Oil Recovery Systems, Inc., Mineola, N.Y.
[22] Filed: Nov. 10, 1971
[21] Appl. No.: 197,248

[52] U.S. Cl. .......................... 210/242, 210/DIG. 21
[51] Int. Cl. ............................................ E02b 15/04
[58] Field of Search ............... 210/83, 242, DIG. 21, 210/525

[56] References Cited
UNITED STATES PATENTS
3,651,943 3/1972 Di Perna .............................. 210/242
3,661,263 5/1972 Peterson ............................. 210/242
3,259,245 7/1966 Earle ................................ 210/242 X
3,595,392 7/1971 Martel .......................... 210/DIG. 21
3,666,102 5/1972 Blanchard ........................... 210/525
2,908,393 10/1959 Lamphier ............................. 20/242

Primary Examiner—Samih N. Zaharna
Assistant Examiner—T. A. Granger
Attorney—Herbert Smith Sylvester

[57] ABSTRACT

A vessel for collection and salvage of oil spills having a vertically adjustable forward-mounted scoop from which fluid collected under the action of gravity and the forward motion of the vessel is directed through conduits into submerged separation tanks under conditions of laminar flow. In the submerged tanks, the fluid is separated into oil, which is transferred to storage tanks, and water which is discharged.

3 Claims, 4 Drawing Figures

Patented Aug. 14, 1973 3,752,317

OIL RECOVERY VESSEL

This invention relates to the recovery of petroleum products from large bodies of water such as the open sea. It also represents an efficient and effective means of transporting such recovered oil to a central collection point.

The vessel described herein collects, from the surface of a large body of water on which the vessel is operating, a mixture of oil and water which it transports to a settling system under conditions of minimal agitation and turbulence, e.g., at a Reynolds number not greater than about 2,000, and preferably below about 1,500, such that streamline or laminar flow (as distinguished from turbulent flow) is maintained. In the settling system the upper oil layer is decanted and recovered, and the lower, aqueous layer is returned to the said large body of water.

The invention will be more particularly described with reference to the accompanying drawings, in which.

Figure 1:
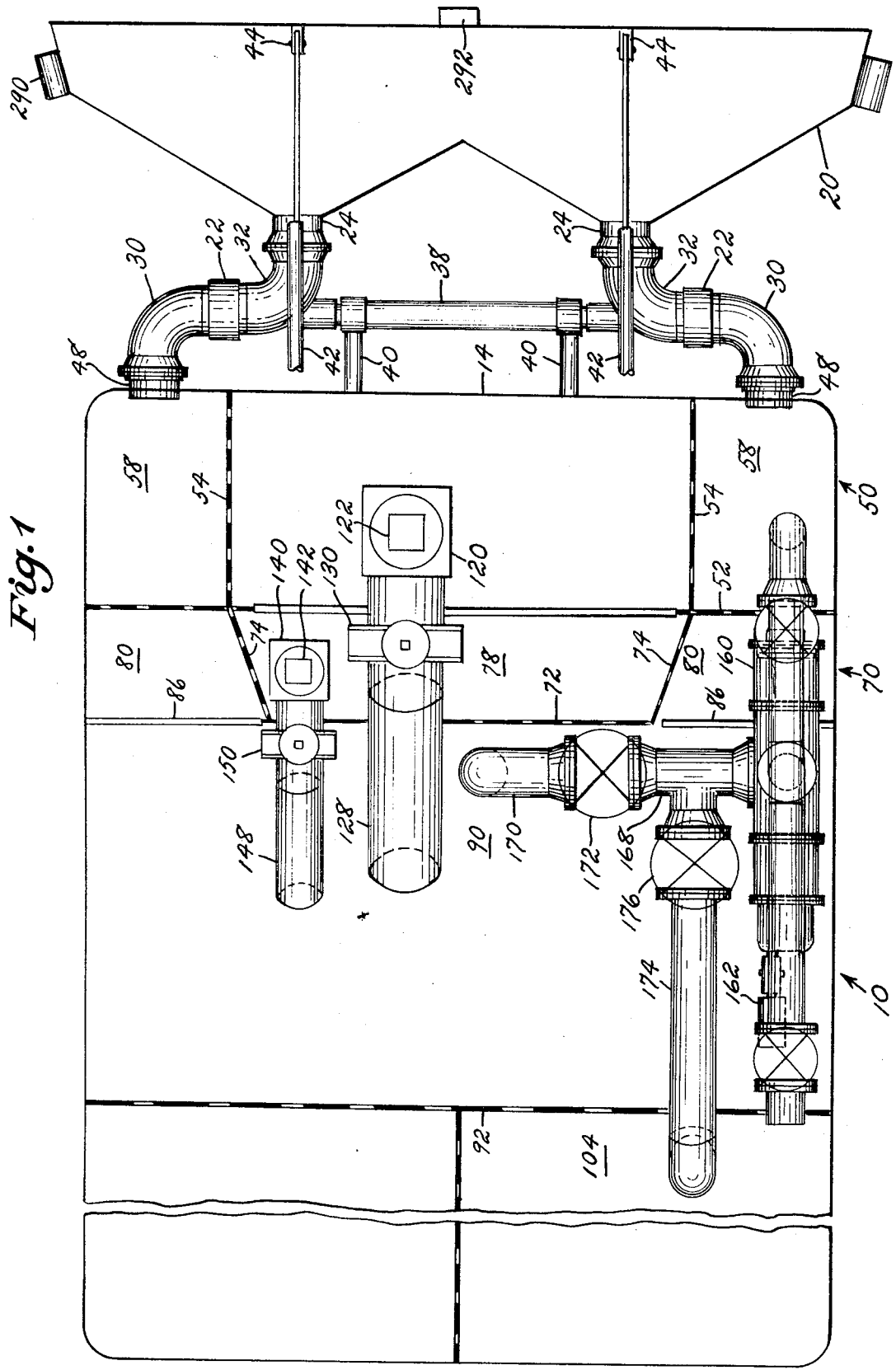
FIG. 1 is a plan view of the instant vessel.

In the preferred embodiment illustrated in the Figures, a vessel having a hull 10 of generally rectangular cross-section in plan and a forward mounted cabin 12 is provided with a blunt bow 14 having a draft somewhat greater than the balance of the body of the hull. A scoop 20 projects forward from the bow and is supported from the forward face of the bow by means of a pair of swivel fittings 22. As best seen in FIG. 1, the scoop is double-throated, the throats each being connected by a short conduit 24 to the swivel fitting 22.

The swivel fittings 22 each consist of an articulated pair of 90° conduit elbow segments 30 and 32. These swivel fittings 22 are disposed below the vessel's waterline 34, and the elbow segments 32 proximal to the scoop and proximate to each other are pivoted on a common hinge 38, mounted on two arms 40 which project forward from the bow. The centerline of rotation of the hinge 38 is common to that of the swivel fittings 22, to permit pivoting of the scoop 20 and each of the swivel fittings 22 about that centerline.

A pair of hydraulic cylinders 42 are disposed between pivots 44 and 46 on the top lip of the scoop 20 and the bow 14 to raise and lower the mouth of the scoop 20 respectively by pivoting the scoop about the common centerline of the swivel fittings 22 and hinge 38.

The elbow segments (of the swivel fittings) nearest the bow 14 are connected to forwardly projecting flanged conduit segments 48 which enter the bow 14 below the waterline of the empty vessel. The conduit segments 48 discharge into an oil-water collection compartment 50 disposed in the bottom of the bow. At this juncture what has been described are the various parts for fluid communication between the scoop and oil-water collection compartment which may be termed first and second conduit means.

The oil-water collection compartment 50 is defined by the hull on its bottom, forward, and outboard sides, and by a transverse bulkhead 52 on its aft sides. A first pair of baffles 54, located inboard of the conduit segments, aid in flow regulation and effectively divides the collection compartment 50 into two (outboard) inlet compartments 58 and a central, primary decanting compartment 60.

The central decanting compartment 60 of the first transverse bulkhead 52, inboard of the baffles 54, is provided with a primary weir 66 opening into an oil-water separation compartment 70 disposed immediately aft of the oil-water collection compartment 50.

The separation compartment 70 is defined by the hull 10, the transverse bulkhead 52, and a second transverse bulkhead 72. A second pair of baffles 74, disposed outboard of the primary weir 66, further aids in flow regulation and effectively divides the separation compartment into a central receiving compartment 78 and two outboard decanting compartments 80. The second transverse bulkhead 72 is provided with a pair of final weirs 86 (disposed between the hull 10 and the baffles 74) opening into an oil collection compartment 90 defined by the hull 10, the second bulkhead 72, and a midships bulkhead 92.

Figure 2:
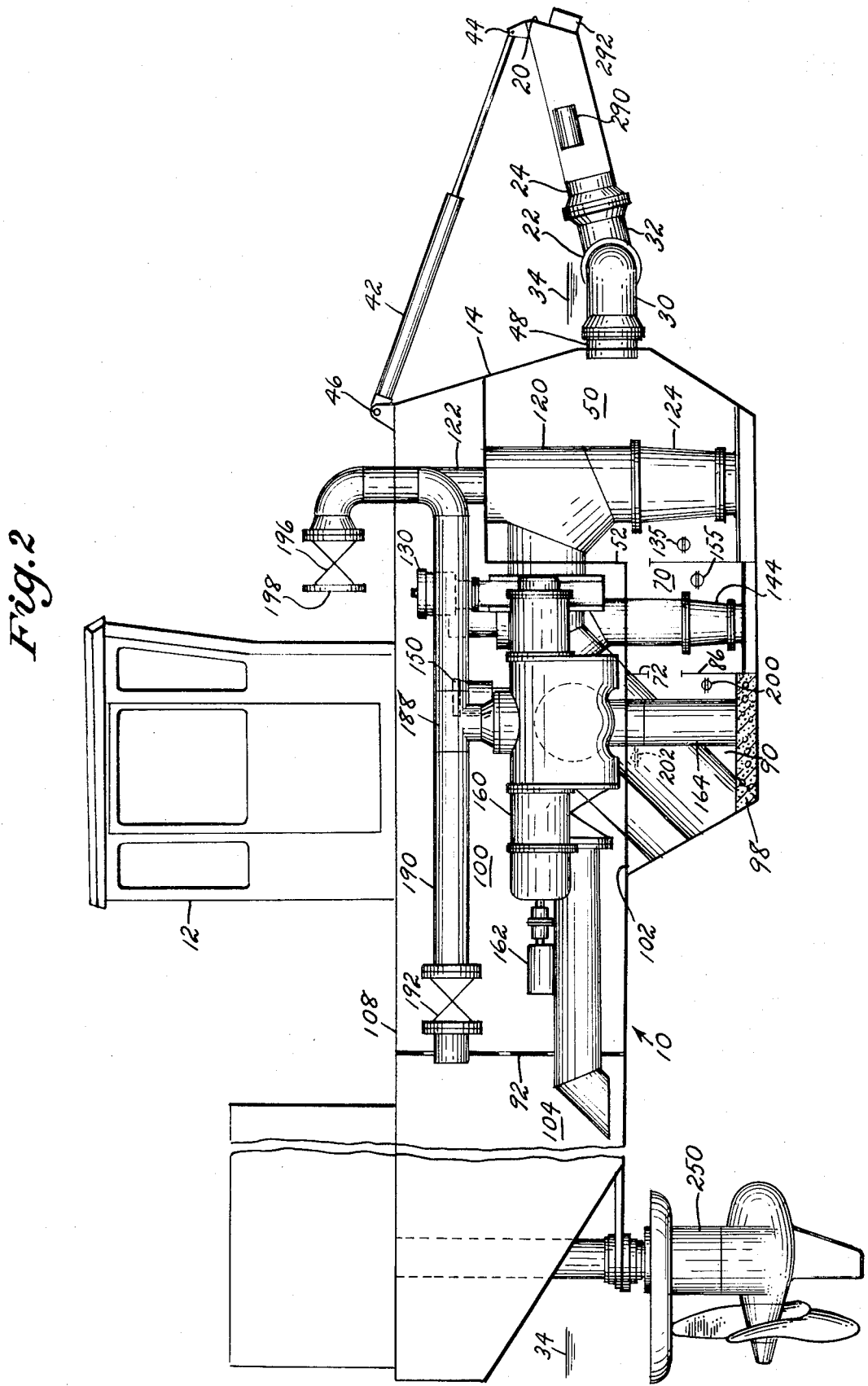
FIG. 2 is a view in elevation of the vessel of FIG. 1.

The depending forward hull section of the vessel is provided with a permanent ballast 98 of concrete and steel chips to maintain submergence of the oil-water collection compartment 50, the oil-water collection compartment 70, the oil collection compartment 90, and the swivel fittings 22 below the waterline 34 of the empty vessel. As may also be observed from FIG. 2, the primary weir 66 is disposed with its bottom lip at a level below the bottom of the swivel fittings 22, and the final weirs 86 are disposed at yet a lower level.

A watertight machinery space 100 is provided by a bottom deck 102 extending from the after hull bottom to the transverse bulkhead 52, and a mid-deck 103 extending from the bulkhead 52 to the bow 14. The body of the vessel aft of the midships bulkhead 90 is divided into oil storage compartments 104 by appropriate bulkheads and a main deck 108.

A water-expelling first centrifugal pump 120 is disposed within the central primary separation section of the oil-water collection compartment 50. The water-expelling first centrifugal pump 120 is driven by a constant speed hydraulic motor 122, and it has an inlet conduit 124 having its opening at the bottom of the oil-water collection compartment 50. The discharge of the pump is carried downwardly and aft by a discharge conduit 128 and is expelled below the surface of the body of water on which the vessel is operating aft through the hull of the depending bow 14 of the vessel, thereby minimizing disturbance of floating oil surrounding the vessel and aiding forward propulsion. A hydraulically actuated butterfly valve 130 is located in the discharge conduit 128.

An oil-water interface sensor 135 is located in the oil-water central primary decanting compartment 60 below the bottom lip of the weir 66, but above the level of the opening of the inlet conduit 124 to the water-expelling first centrifugal pump 120.

A final water-eliminating centrifugal pump 140 is disposed in the watertight machinery space 100. This pump is driven by a second constant speed hydraulic motoR 142, and it has an inlet conduit 144 having its opening at the bottom of the oil-water receiving compartment 70. The discharge of this pump 140 is carried downwardly and aft by a discharge conduit 148 and is expelled rearwardly through the depending bow section into the body of water on which the vessel is operating below the surface thereof. A hydraulically actuated butterfly valve 150 is located in the discharge conduit 148, and an oil-water interface sensor 155 is disposed in the receiving compartment 70 below the bottom lip of the final weirs 86, but above the level of the opening of the intake of the inlet conduit 144 to the final water-eliminating centrifugal pump 140.

A rotary screw pump 160 is disposed within the watertight machinery space 100, and is driven by a hydraulic motor 162. The intake of the rotary pump is connected to a Tee 168, a first branch 170 of which passes through a valve 172 to the base of the oil collection compartment 90. The remaining branch 174 of the Tee 168 communicates through a valve 176, with the lowest point of the oil storage compartments 104.

The discharge of the rotary screw pump 160 passes to a Tee 188, the branches of which lead, respectively, by means of appropriate conduits 190 and 194, through a valve 192 to the oil storage compartments 104 and through a valve 196 to an oil unloading connector 198.

The oil collection compartment 90 is equipped with a low level oil sensor 200, and a high level oil sensor 202 which, respectively, are linked to the control system for the hydraulic motor 160 and to the control system for the hydraulic cylinders 42 which determine the elevation of the scoop 20.

Figure 3:
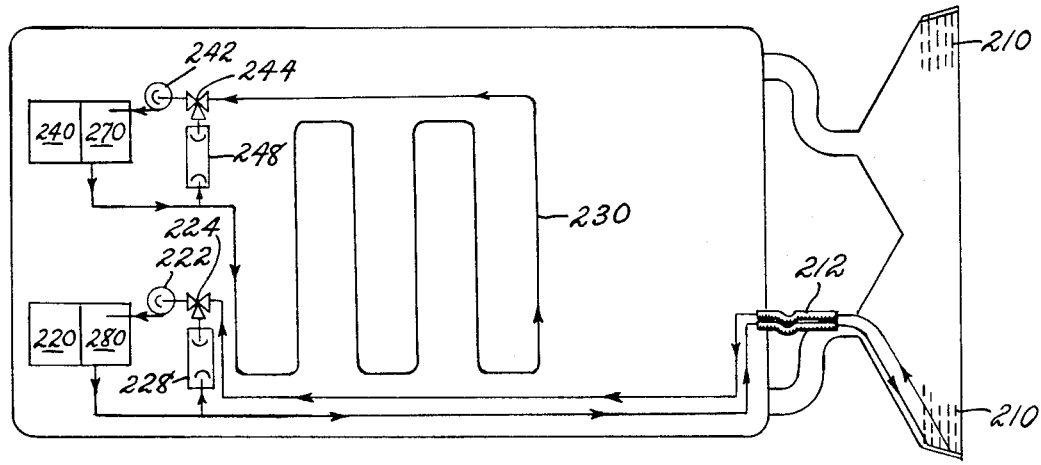
FIG. 3 illustrates diagramatically the flow path of the cooling water of the engines of the vessel of FIGS. 1 and 2.
Figure 4:
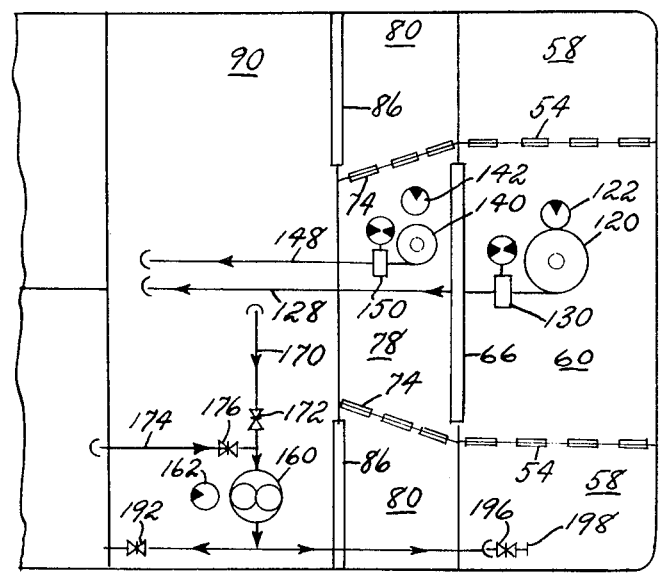
FIG. 4 is a diagramatic presentation of the flow of oil and water in the normal collection, separation, and recovery operation of the vessel of FIGS. 1 and 2.

As indicated in FIG. 3, the scoop 20 is provided with a combination trash rake and grid heater 210 which keeps the scoop clear of trash and allows heating of heavy oil for ease of collection. The heating unit is connected by flexible hose 212 and appropriate conduits to the source of cooling medium for a starboard engine 220, which is mounted topside on the stern of the vessel. A circulating pump 222, a three-way thermostatic valve 224, and a keep cooler 228 complete this cooling system.

Grid heaters 230 are also provided for the oil storage compartments 104 and may be supplied with heating medium from a port diesel engine 240 mounted topside on the stern or with steam from a jenny, as required. A circulating pump 242, a three-way thermostatic valve 244, and an associated keel cooler 248 complete the cooling system for the port engine 240.

In addition to the diesel engines 220 and 240 mounted topside on the stern, the vessel also carries on its stern, in association with each diesel engine, a right-angle propulsion drive unit 250. A hydraulic pump 270 is coupled to the port engine, and an electric generator 280 is associated with the starboard engine.

The oil storage compartments 104 and the watertight machinery space are provided with air vents as appropriate.

A float 290 is vertically-adjustably disposed on each side of the scoop 20, and a sensor 292 is carried forward on the scoop. This sensor 292, is employed to assist in maintaining the lower edge of the scoop approximately 2 or 3 inches below the surface of the water during operation, as dictated by sea conditions.

In operation, while the vessel is underway (but not recovering oil), its two diesel engines 220 and 240 drive the right-angle propulsion units 250 and 260 on the stern of the vessel, thereby ensuring maximum vessel speed. During recovery of oil, however, the port propulsion unit 260 is declutched and the hydraulic pump 270 associated with the port diesel engine 240 is engaged to power the vessel's central hydraulic system which includes, inter alia, the hydraulic motors 122, 142 and 162 for driving the (first and second) centrifugal pumps 120 and 140 and the rotary screw pump 160 respectively, rotary actuators for the butterfly valves 130 and 150, and the hydraulic cylinders 42 for raising and lower the scoop 20.

During oil recovery, the vessel is propelled only by the starboard engine 220 through the propulsion unit 250, enabling the vessel properly to maneuver. Additionally, the starboard diesel engine drives the electric generator 280, providing the vessel with electrical power.

During an oil recovery operation, the height of the scoop 20 with respect to the water is sensed by means of the sensor 292 on the scoop. As dictated by conditions sensed by the sensor, the hydraulic cylinders 42 are actuated to position the scoop appropriately.

The vessel is propelled at a speed such that the mixture of oil and water which is directed by the scoop into the hold of the vessel due to the forward speed of the vessel and the influence of gravity on the fluid mixture is maintained in conditions of streamline flow, i.e., at a Reynolds number not significantly greater than about 2,000 and preferably below about 1,500.

The fluid medium passes from the throat of the scoop through the swivel fittings 22 into the inlet compartments 58 of the oil-water collection compartment 50, from which it flows through the baffles 54 into the central primary decanting compartment 60.

The oil-water interface in the central primary decanting section 60 is maintained below the bottom lip of the primary weir 66 and above the entry to inlet conduit 124 of the first centrifugal pump 120. The first centrifugal pump, which is run at constant speed, removes water from the compartment at a rate determined by the extent to which the hydraulically actuated butterfly valve 130 is opened. The position of this valve is determined by the oil-water interface sensor 135.

The oil-water interface sensor 135, in the central primary decanting compartment, senses the cleavage between oil and water. Should the sensor indicate "oil," the control system will tend to close the butterfly valve 130 by means of hydraulic actuators, so that the oil-water interface will rise to the point where the sensor indicates "water," at which time the control system will tend to open the butterfly valve. Thus, the butterfly valve 130 is continually throttled to maintain the oil-water interface at approximately the level of the sensor 135, i.e., intermediate the bottom lip of the primary weir 66 and the intake for the centrifugal pump 120. This is possible, of course, by virtue of the non-positive displacement characteristic of the centrifugal pump employed.

Oil overflowing the primary weir 66 is discharged from the central primary decanting compartment 60 into the central section of the oil-water receiving compartment 70, from which it flows through the second pair of baffles 74 into the outboard decanting compartments 80. Water is eliminated from the bottom of the receiving compartment 70 by the final water-eliminating centrifugal pump 140 and associated conduits, hydraulic motor 142, and sensor 155 in a manner analogous to that described in the preceding paragraph in connection with the central primary decanting compartment.

Oil which overflows the final weirs 86 into the oil collection compartment 90 is pumped by the rotary screw pump 160 through the conduit 170 and opened valves 172 and 192 to the oil storage compartments 104, the valves 176 and 196 being closed.

The inlet to the conduit 170 is approximately at the bottom of the oil collection compartment 90, whereas the low level sensor 200 is slightly above the inlet to the conduit but below the level of the final weirs 86. In the event the oil level in the oil collection compartment drops below the low-level oil sensor 200, a signal is transmitted to the hydraulic motor 162 which drives the rotary screw oil pump 160, shutting off the motor.

The high-level oil sensor 202 is disposed above the final weirs 86, near the top of the oil collection compartment 90. In the event the oil level in the secondary oil collection compartment reaches the high-level sensor 202, the sensor transmits a signal which actuates the hydraulic cylinders 42 to elevate the scoop 20.

Oil may be discharged from the oil storage compartments 104 by use of the rotary screw pump 160 by closing valves 172 and 192 and opening valves 176 and 196 such that the oil may enter the pump inlet through the conduit 174 and be discharged through the unloading connector 198.

What is claimed is:

1. A vessel for recovering oil which is floating on the surface of a body of water comprising a hull, a scoop projecting forward of said hull for collecting a liquid mixture of said oil and water from the surface of said body of water, said scoop being pivotally mounted and vertically movable to compensate for sea conditions and changes in the waterline of said vessel, first and second inlet compartments disposed in said hull with the bottom walls of said compartments substantially below the surface of said body of water, first and second conduit means in communication with said scoop and in respective communication with each of said first and second inlet compartments, a first decanting compartment constructed and arranged between said first and second inlet compartments in fluid communication therethrough, pump means for removing water from adjacent the bottom walls of said first decanting compartment, weir means comprising a wall of said first decanting compartment with an upper edge of said weir below the horizontal plane of the first and second conduit means, a receiving component adjacent said weir in fluid communication with the first decanting compartment, second and third decanting components constructed and arranged on opposite ends of said receiving compartment and in fluid communication with said receiving compartment through said opposite ends of said compartment, weir means comprising a wall of each of said second and third decanting compartments with an upper edge of each of said weirs below the upper edge of said weir between said first decanting compartment and said receiving compartment, an oil collection compartment constructed and arranged in fluid communication with said second and third decanting compartments and adapted to receive oil over the upper edges of said weir means of each of said second and third decanting compartment, pump means for removing collected oil from said oil collection compartment.

2. A vessel as set forth in claim 1 wherein said vessel is powered by a heat producing engine being cooled by a liquid circulating means, means for heating said scoop by means of said liquid.

3. A vessel as set forth in claim 1 wherein said pump means for removing water from adjacent the bottom walls of said first decanting compartment includes sensor means responsive to the quantity of water in said first decanting compartment whereby a pump of said pump means operates to remove water from said first decanting compartment at a rate sufficient to maintain the level of the water therein below the weir means comprising a wall of said first decanting compartment.

* * * * *